3,732,213
NOVEL TRIAZOLE COMPOUNDS
Hans Balzer, Munchenstein, Basel-Land, and Fritz Fleck, Bottmingen, Basel-Land, Switzerland, and Alec Victor Mercer, Leeds, and Roger Paver, Bradford, England, assignors to Sandoz Ltd. (also known as Sandoz AG), Basel, Switzerland
No Drawing. Filed Dec. 14, 1970, Ser. No. 98,148
Claims priority, application Switzerland, Dec. 19, 1969, 18,918/69; Oct. 27, 1970, 15,924/70
Int. Cl. C09b 23/00
U.S. Cl. 260—240 CA          8 Claims

ABSTRACT OF THE DISCLOSURE

Triazole derivatives of the formula

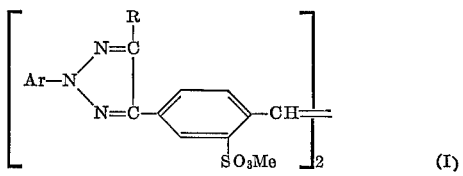

wherein Ar represents an optionally substituted aryl radical; R represents hydrogen, a low molecular alkyl radical or an optionally substituted phenyl radical; and Me represents a hydrogen, ammonium or alkali metal ion, an equivalent of an alkaline earth metal or an amine cation.

---

The invention relates to novel triazole derivatives of the formula

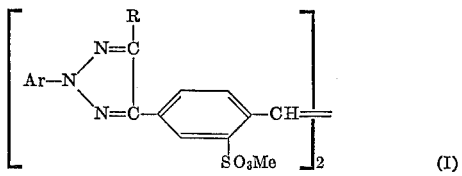

wherein Ar represents an optionally substituted aryl radical; R represents hydrogen, a low molecular alkyl radical or an optionally substituted phenyl radical; and Me represents a hydrogen, ammonium or alkali metal ion, an equivalent of an alkaline earth metal or an amine cation.

The process for the production of the novel triazole compounds of the Formula I is characterized in that 1 mol of a compound of the formula

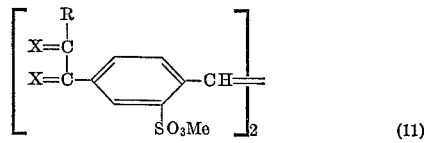

wherein one X=O and the other X=N—OH, is reacted with 2 mols of an arylhydrazine of the formula $$Ar\text{—}NH\text{—}NH_2 \qquad (III)$$

and the resulting reaction product is cyclized, or the reaction product is oxidatively cyclized and the triazole-N-oxide formed is reduced.

Examples of optionally substituted aryl radicals are the mono- or dicyclic aryl radicals of the benzene, naphthalene, diphenyl or heterocyclic series which may contain, for example, the following substituents: low molecular alkyl or alkoxy radicals, halogen atoms (chlorine, fluorine), cyano groups, alkylsulphonyl groups, carboxylic acid, carboxylic acid ester, lactone and sulphonic acid groups, optionally mono- or disubstituted sulphonic acid amide and carboxylic acid amide groups, acylamino group and benzoxazolyl, benzthiazolyl or benzimidazolyl groups.

Examples of such aryl residues are: phenyl, 2-, 3- or 4-methyl-, 2,4-, 2,5- or 2,6- or 3,5-dimethyl-, 2,4,6- or 2,4,5-trimethylphenyl, 4-ethyl-, 4-iso-propyl-, 4-n-propyl-, 4-n-butyl-, 4-tert.-butyl-, 4-tert.-amyl-, 4-n-amylphenyl, 2- or 4-methoxy-, -ethoxy- or n-butoxyphenyl, 2-, 3- or 4-chlorophenyl, 4-fluoro-, 4-cyano-, 4-methylsulphonyl- or 4-ethylsulphonylphenyl, 3- or 4-sulphophenyl, 2-, 3- or 4 - carboxyphenyl-, 2-, 3- or 4 - ethoxycarbonyl- or -methoxycarbonylphenyl, 3- or 4-aminocarbonyl-, -methylaminocarbonyl-, d-dimethylaminocarbonyl-, ethylaminocarbonyl-, -diethylaminocarbonyl-, 2' - hydroxyethylaminocarbonyl-, -di - (2'-hydroxyethyl)-aminocarbonyl-, -2'- or -3'-hydroxypropylaminocarbonylphenyl, 3- or 4-methylaminosulphonyl-, 3- or 4-ethylaminosulphonyl-, 3- or 4-dimethylaminosulphonyl-, 3- or 4-(2'-hydroxyethylaminosulphonyl)-, 3- or 4-(2'- or 3'-hydroxypropylaminosulphonyl)-, 3- or 4-di-(2'-hydroxyethyl)-aminosulphonyl, 3- or 4-morpholino-, 3- or 4-pyrrolidino-, 3- or 4-piperidino- or 3- or 4-hexamethyleneiminosulphonyl, 3- or 4-aminosulphonylphenyl as well as radicals of the formulae

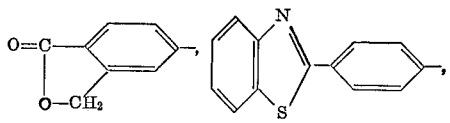

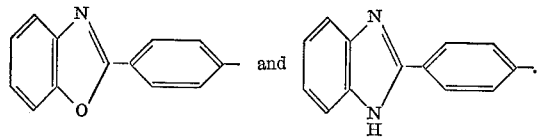

Examples of acylamino groups are optionally substituted benzoylamino-, phenylsulphonylamino-, alkylsulphonylamino-, alkanoylamino- and alkoxycarbonylamino radicals, e.g. benzoylamino, 4-methyl- or 4-chlorobenzoylamino, phenyl- and 4-methylphenylsulphonylamino, methyl-, ethyl-, n-propylsulphonylamino, propionylamino, butyrylamino, acetylamino, methoxycarbonylamino and ethoxycarbonylamino.

Suitable phenyl radicals with such substituents are, for example, 4 - propionylamino-, 4-acetylamino-, 3-acetylamino-, 4-methoxycarbonylamino- or 4-ethoxycarbonylaminophenyl. Of the naphthyl and diphenyl radicals there may be mentioned the following: naphthyl-1, naphthyl-2, 4-methyl- or 4-methoxynaphthyl-1, 4-, 5- or 6-sulphonaphthyl-1, 5- or 6-sulphonaphthyl-2 and diphenylyl-4. As heterocyclic radicals there may be mentioned, for example, pyridyl-2, -3 or -4, 6-methylbenzthiazolyl-2 and 6-methyl-4-sulphobenzthiazolyl-2.

Preferred aryl radicals are: phenyl, 2-, 3- or 4-methyl- or -chlorophenyl, 2- or 4-methoxy- or -ethoxyphenyl, 3- or 4-sulphophenyl, 3- or 4-aminosulphonylphenyl or 4-sulphonaphthyl-1.

The low molecular alkyl radicals R preferably contain 1 to 5 carbon atoms: methyl, ethyl, n-propyl, isopropyl, n-butyl, n-amyl, iso-butyl, iso-amyl.

The phenyl radical R may contain the same substituent as the aryl radical Ar, preferably methyl, methoxy, ethoxy, chlorine, acetylamino or —SO₃H.

As amine cations there may be mentioned, for example those which are derived from the following amines: methylamine, ethylamine, n - propylamine, n-butylamine, n-amylamine, iso-propylamine, iso-butylamine, tert.-butylamine, dimethylamine, trimethylamine, methylethylamine, diethylamine, triethylamine, monoethanolamine, diethanolamine, N-methyldiethanolamine, triethanolamine, iso-propanolamine, di - iso - propanolamine, tri-iso-propanolamine, 2 - ethoxyethylamine, 2 - methoxyethylamine, 3-methoxypropylamine, amino - tris-hydroxymethylmethane, further tetramethylammonium hydroxide and tetraethylammonium hydroxide.

The compounds of the Formula II may be produced, for example, by the reaction of the tetrazo compound from 4,4'-diaminostilbene-2,2'-disulphonic acid in aqueous or aqueous-organic acid (for example in a pH value range of from 1 to 6, preferably 4 to 5) medium at temperatures of 0° up to about 50° C., preferably 10° to 30° C. with compounds of the formula

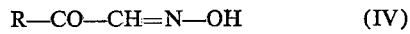

R—CO—CH=N—OH  (IV)

in the presence of a catalytic amount of a copper salt, for example cupric sulphate, cupric chloride, cuprous chloride, cuprous iodide, if desired with the addition of a neutral sulphite and/or an alkali metal halide (for example NaCl, KBr, KI) and/or a buffer (for example sodium acetate).

The reaction of the compounds of the Formula II with the hydrazines of the Formula III may be effected, for example, in aqueous or aqueous-organic (for example in a mixture of water and alcohol, or ethylene glycol or ethoxyethanol or dioxan) weakly acid (for example in a pH value range of from 2 to 7, preferably in the pH value range of from 4 to 6) preferably buffered medium (for example with sodium acetate and optionally acetic acid) at temperatures of from 0° to 150° C., preferably at 90° to 110° C., in about 30 minutes to 12 hours. The resulting hydrazone is then precipitated out, for example by salting out, suctioned off, if necesary washed and dried.

The cyclization of the resulting hydrazone is effected with a dehydration agent, for example organic dehydration agents such as phosgene, keten or preferably of carboxylic anhydrides or halides (carboxylic chlorides and bromides). Examples of these are benzoic anhydride or chloride and preferably the low molecular aliphatic saturated or unsaturated carboxylic anhydrides or halides such as butyric anhydride or chloride, propionic anhydride or chloride, acetic chloride or bromide, acrylic anhydride or chloride and especially acetic anhydride.

It is possible to effect the cyclization in the dehydrating agent itself without any solvent or preferably in an organic inert solvent.

Examples of suitable solvents are optionally substituted, e.g. chlorinated or nitrated, aromatic hydrocarbons and preferably the liquid carboxylic acids upon which the carboxylic anhydrides or halides used as dehydration agent are based, for instance propionic acid or acetic acid, further tertiary amines, for instance pyridine and pyridine base mixtures, amides, for instance dimethylformamide, dimethylacetamide, N-methylpyrrolidone and phosphoric acid tris-(dimethylamide), sulphoxides and sulphones, for instance dimethylsulphoxide, dimethylsulphone and tetramethylenesulphone.

Suitably working is effected at temperatures of from 50° to 150° C., preferably 100-120° C., during about 2 to 24 hours, if desired in the presence of a catalyst, for example an alkali metal salt of a low molecular carboxylic acid, for instance sodium acetate.

In order to isolate the resulting triazole compound it is possible to distil off the solvent, preferably at a reduced pressure, take up the residue in water, dissolve by the addition of an alkali in the hot, separate from undissolved matter by filtration and precipitate out from the filtrate the triazole compound by acidifying or salting out, then suctioning off, if necessary washing and drying.

The oxidative cyclization is suitably effected by means of oxidation agents, for instance chromic acid, sodium or potassium bichromate or hydrogen peroxide in acid medium or with alkali metal ferricyanides and preferably with hypohalogenites (e.g. NaOCl, KOCl, LiOCl, NaOBr of chlorinated lime) or with copper-II-compounds (copper-II-chloride, -sulphate, -acetate, -naphthenate, -hydroxide) in the presence of compounds with alkaline reaction (e.g. alkali metal hydroxides or carbonates, ammonia, ammonium carbonate or amines) or likewise with oxygen or air in the presence of a catalytic amount of a copper-II-compound.

Examples of solvents are water, if desired in the presence of a suitable mineral acid, for instance sulphuric acid, or of an organic acid stable towards oxidation agents, for instance propionic acid and especially acetic acid, or a mixture of such organic acids and water, when working is effected in acid medium.

For the oxidative cyclization in alkaline medium it is possible to use water and/or an organic solvent inert towards the oxidation agent, preferably a tertiary amine, for instance pyridine or a mixture of pyridine bases. Working is effected, for example, at temperatures of from 20° to 120° C., preferably in the temperature range of from 40° to 100° C., when copper-II-compounds are used, or in the temperature range of from 50° to 80° C. when alkali metal hypohalogenites are used.

The isolation of the N-oxide compounds may be effected, for example, by direct cooling or distilling off the organic solvent or neutralizing of the amine used as solvent or acidifying or salting out and optionally cooling, then suctioning off, washing, if necessary, and drying.

The reduction of the N-oxide compounds to the triazole compounds of the Formula I may be effected, for example, with reductive acid salts of sulphur or phosphorus or with electronegative metals in acid medium, for example iron, tin, magnesium, aluminium or preferably zinc, or with tin-II-compounds, for instance $SnCl_2$, in acid, for example hydrochloric acid, medium. Examples of reaction media are water, optionally halogenated hydrocarbons, for instance benzene, toluene, xylene, chlorobenzene, low molecular alkane carboxylic acids, for instance propionic acid and especially acetic acid, low molecular weight alcohols, ethers or ether alcohols, for instance methanol, ethanol, n- or iso-propanol, n-butanol, dioxan 1,2-dimethoxy- or 1,2-diethoxyethane, methoxy- or ethoxybenzene, 2-methoxy-, 2-ethoxy- or 2-n-butoxyethanol, further amides, for instance formamide, dimethylformamide, dimethylacetamide, N-methylpyrrolidone or phosphoric acid tris-(dimethylamide), sulphoxides or sulphones, for instance dimethylsulphoxide, dimethylsulphone or tetramethylenesulphone or mixtures of the above solvents amongst each other and/or with water. Advantageously working is effected at temperatures of from 50° to about 100° C. and the triazole compounds are isolated by cooling and suctioning off, if necessary after removing of the organic solvent or solvents and/or salting out.

The novel triazole compounds of the Formula I are colourless to light yellow powders which dissolve in water with a brilliant blue tinged fluorescence and may be used for optically brightening textile fibres and paper and especially cellulose fibres, e.g. cotton, and synthetic polyamide fibres, e.g. polyamide 6, 66, 11, 610 and 66/6. They are advantageously used in amounts of from 0.001% to 0.5%, preferably from 0.05 to 0.2%, based on the substrate to be brightened, and produce in accordance with the exhaustion or padding process or also from washing liquor brilliant white shades of very good light fastness and good wet fastness properties (fastness to washing, perspiration, water, peroxide bleaching, chlorine and chlorite).

Especially interesting compounds of the Formula I have the formula

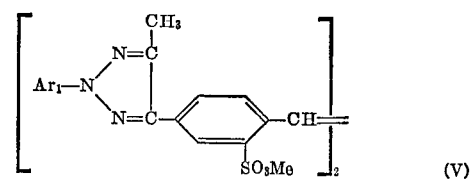

(V)

wherein $Ar_1$ represents a naphthyl or sulphonaphthyl radical, a diphenyl radical or a phenyl radical which may be substituted with halogen atoms (chlorine, fluorine), low molecular alkyl or alkoxy radicals (methyl, ethyl, n- or iso-propyl, n-, iso- or tert.-butyl, n-, iso- or tert.-amyl, methoxy, ethoxy, n-butoxy), cyano, carboxylic acid or sulphonic acid radicals, optionally further substituted alkoxy carbonyl-, aminocarbonyl- or aminosulphonyl radicals or with a lactone group —CH$_2$—O—CO—.

The triazole compounds of the Formula I are differentiated from the triazole compounds which are most closely comparable and known from French patent specification No. 1,480,699 by an even more brilliant shade and a greater strength on polyamide and cellulose fibres.

In the following examples parts are by weight, percentages are by weight and the temperature stated in degrees centigrade. The relationship of the parts by volume to the parts by weight is the same as that of the millilitre to the gram.

EXAMPLE 1

5.1 parts of 4,4'-bis-(1"-isonitroso-2"-oxopropyl-1")-stilbene-2,2'-disulphonic acid are introduced into 50 parts of water and neutralised with the requisite amount of 15% aqueous sodium carbonate solution.

To the stirred solution are added 3.6 parts of p-chlorophenylhydrazine hydrochloride, 3 parts of sodium acetate trihydrate and 50 parts of water. The mixture is heated to 100° during 1 hour, stirred for 30 minutes at 100° and then allowed to cool to 20° during 1½–2 hours. 5 parts of sodium chloride are then added in portions over 30 minutes, the reaction mixture cooled to 10° and the yellow coloured hydrazone washed with 110 parts of 10% sodium chloride solution and dried at 50° under reduced pressure. Yield of hydrazone: 8 parts=100%. 8 parts of the hydrazone, 4 parts of anhydrous sodium acetate, 95 parts of dimethylformamide and 22 parts of acetic anhydride are mixed and heated to 120° during 2 hours. The mixture is stirred for 20 hours at 120°, then cooled to 70° and the solvent removed under reduced pressure. The residue is diluted with 150 parts of water and 4 N sodium hydroxide solution added until the pH of the mixture is 8–9. The mixture is filtered, washed with 50 parts of cold water, and the solid product recrystallized from 50% aqueous 2-ethoxyethanol solution to give 4.5 parts of sodium 4,4'-bis-(2" - parachlorophenyl - 5" - methyl-v.triazolyl-4")-stilbene-2,2'-disulphonate as a pale yellow coloured solid.

4,4'-bis-(1"-isonitroso - 2" - oxopropyl-1")-stilbene-2,2'-disulphonic acid is prepared by the following method:

73.5 parts of 95% sulphuric acid are added cautiously at ambient temperature and with stirring to a mixture of 4,4'-diaminostilbene-2,2'-disulphonic acid (57.3 parts of 64.6% wet cake), 200 parts of water and 15.6 parts of anhydrous sodium carbonate. The resulting suspension is stirred, cooled to 7° and 15 parts of sodium nitrite added in portions during 1–2 hours whilst keeping the reaction temperature between 5 and 10°. The reaction mixture is stirred at 7–10° for a further 30 minutes, the yellow precipitate of tetrazonium salt filtered and then washed acid free with 10% sodium chloride solution.

The tetrazonium salt is added in portions at 10–15° to a mixture of 20 parts of α-isonitrosoacetone, 5 parts of cupric sulphate pentahydrate, 0.8 part of anhydrous sodium sulphite, 35 parts of anhydrous sodium acetate and 73 parts of 10% sodium chloride solution. The mixture is stirred 1 hour at 15–20° and then cooled to 5°. 23–35 parts of 35% hydrochloric acid are added until the pH of the mixture reaches 1. The mixture is stirred 10 minutes at 5°, filtered and the impure brown coloured product washed 4 times with 55 parts of 10% sodium chloride solution to give 4,4'-bis-(1"-isonitroso-2"-oxopropyl-1")-stilbene-2,2'-disulphonic acid as a fawn coloured solid. Yield 20 parts=39%.

EXAMPLE 2

10.2 parts of 4,4'-bis-(1"-isonitroso-2"-oxopropyl-1")-stilbene-2,2'-disulphonic acid, 9.5 parts of 1-hydrazinonaphthalene-4-sulphonic acid, 12 parts of sodium acetate trihydrate and 50 parts of water are mixed and warmed to 100° during 1 hour. The mixture is stirred for 30 minutes at 100°, cooled to 20° and 20 parts of sodium chloride added in portions over 30 minutes. The mixture is stirred for 1 hour at 0–5° and the yellow coloured hydrazone filtered, washed with 110 parts of 10% sodium chloride solution and dried at 50° under reduced pressure. Yield 15 parts=78%.

6.8 parts of the hydrazone, 3 parts of anhydrous sodium acetate, 57 parts of dimethylformamide and 22 parts of acetic anhydride are mixed and heated at 115–120° for 15 hours. The mixture is cooled to 70° and the solvent removed under reduced pressure. The residue is then diluted with 100 parts of water and the pH adjusted to 9 with 4 N sodium hydroxide solution. 0.5 part of decolourising charcoal is added and the mixture stirred at 100° for 30 minutes, filtered at 95° and the filtrate treated with 10 parts of sodium chloride. The mixture is cooled to 5° and the precipitate filtered, washed with 28 parts of 5% sodium chloride solution and dried at 60° to give 3.9 parts (62% of the theoretical amount) of the tetrasodium salt of 4,4' - bis-[2"-(4"'-sulphonaphthyl-1"')-5"-methyl-v.triazolyl-4"]-stilbene-2,2'-disulphonic acid as an almost colourless powder.

EXAMPLE 3

10 parts of the hydrazone prepared from p-chlorophenylhydrazine hydrochloride and 4,4'-bis-(1"-isonitroso-2"-oxopropyl-1")-stilbene-2,2'-disulphonic acid are added to 30 parts of urea at 135°. The mixture is heated to 170°, maintained at this temperature for 3 hours, cooled to 135°, a solution of 0.8 part of sodium hydroxide and 1 part of sodium hydrosulphite in 100 parts of water added and the mixture stirred and cooled to 50°. The product is filtered and washed with 20 parts of water to give 6.0 parts (63% of the theoretical amount) of sodium 4,4'-bis-(2"-para-chlorophenyl-5"-methyl-v.triazolyl-4") - stilbene-2,2'-disulphonate as a yellow orange coloured product, which is recrystallized from 50% aqueous 2-ethoxyethanol solution to give a pale yellow coloured powder.

EXAMPLE 4

31 parts of 4,4'-bis-(1"-isonitroso-2"-oxopropyl-1")-stilbene-2,2'-disulphonic acid, 21 parts of p-cyanophenylhydrazine hydrochloride, 20 parts of sodium acetate trihydrate and 350 parts of water are mixed and heated to 100°. The reaction mixture is stirred for 30 minutes at 100° and then allowed to cool to 20°. 35 parts of sodium chloride are then added and the mixture stirred for 30 minutes. The yellow coloured hydrazone is filtered, washed with 200 parts of water and then dried at 50° under reduced pressure. Yield 42 parts=86.5%.

41 parts of the hydrazone, 10 parts of anhydrous sodium acetate, 100 parts by volume of acetic anhydride and 400 parts by volume of dimethylformamide are mixed and heated to 115° over 2 hours. After the reaction mixture has been stirred for 9 hours at 115° the solvent is removed under reduced pressure. The residue is diluted with 600 parts by volume of 30% aqueous ethyl alcohol solution and 4 N sodium hydroxide added until the pH of the mixture is 8–9. The product is filtered, washed with 200 parts of water to give 23 parts (56% of the theoretical amount) of sodium 4,4'-bis-[2"-(4"'-cyanophenyl)-5"-methyl-v.triazolyl-4"]-stilbene-2,2'-disulphonate as a yellow coloured solid. The product is recrystallized from 50% aqueous dimethylformamide solution to give a bright yellow coloured powder.

EXAMPLE 5

5 parts of sodium 4,4'-bis-(2"-p.cyanophenyl-5"-methyl-v.triazolyl-4")-stilbene-2,2'-disulphonate are added to a solution containing 5.3 parts by volume of 30% of hydrogen peroxide, 0.13 part of sodium hydroxide, 10 parts of water and 100 parts by volume of diethylene glycol.

The yellow coloured suspension is warmed to 40° and the temperature maintained at 40° for 30 minutes. The mixture is then warmed and the temperature maintained at 50° for 2½ hours. 2% aqueous acetic acid is added until the pH of the reaction is 5–6. 100 parts of water are then added and the reaction mixture cooled to 5°. The mixture is filtered and washed with 20 parts of water to give 4.4 parts (84.4% of the theoretical amount) of sodium 4,4'-bis-[2''-(4'''-aminocarbonylphenyl)-5''-methyl-v.triazolyl-4'']-stilbene-2,2'-disulphonate as a pale yellow coloured solid.

EXAMPLE 6

4.7 parts of 4-aminocarbonylphenylhydrazone hydrochloride, 6.4 parts of 4,4'-bis-(1''-isonitroso-2''-oxopropyl-1'')-stilbene-2,2'-disulphonic acid, 4 parts of sodium acetate trihydrate and 75 parts of water are mixed and heated to 100°. The mixture is stirred for 30 minutes at 100°. 7.5 parts of sodium chloride added and the yellow coloured suspension cooled to 10°, filtered, and the residue dried under reduced pressure at 50° to give the hydrazone as a yellow coloured solid. Yield 10 parts=97%.

10 parts of the hydrazone, 3.3 parts of anhydrous sodium acetate, 23 parts by volume of acetic anyhdride and 60 parts by volume of dimethylformamide are mixed and heated to 95° during 2 hours. The mixture is stirred for 5 hours at 95° and the solvent removed under reduced pressure. The residue is diluted with 60 parts of water, 1 part of sodium hydrosulphite added and the yellow coloured suspension stirred for 30 minutes at 60–70°. The mixture is cooled to 10°, filtered and washed with 20 parts of water to give 6.1 parts (64% of the theoretical amount) of sodium 4,4'-bis-[2''-(4'''-aminocarbonylphenyl)-5''-methyl-v.triazolyl-4'']-stilbene-2,2'-disulphonate as a yellow coloured solid which is recrystallized from a 50% aqueous 2-ethoxyethanol solution to give a pale yellow coloured powder.

EXAMPLE 7

10.2 parts of 4,4-bis-(1''-isonitroso-2''-oxopropyl-1'')-stilbene-2,2'-disulphonic acid, 7.52 parts of p-hydrazinobenzene-sulphonic acid, 10 parts of sodium acetate trihydrate and 30 parts of water are mixed and heated to 100°. The red-orange coloured solution is stirred for 30 minutes at 100°, cooled to 10° and 7.5 parts of sodium chloride added. The yellow-orange coloured hydrazone is filtered and washed with 2 x 50 parts by volume of 15% sodium chloride solution. The product is dried under reduced pressure at 50°. Yield 10.1 parts=59.5%.

9.2 parts of the hydrazone, 2 parts of anhydrous sodium acetate 15 parts by volume of acetic anhydride and 60 parts by volume of dimethylformamide are mixed and heated to 100° during 2 hours. The temperature of the mixture is maintained at 100° for 16 hours, and the reaction mixture then cooled to 70° and the solvent removed under reduced pressure. The residue is diluted with 160 parts of water and the pH of the mixture adjusted to 8–9 by addition of 4 N sodium hydroxide solution. The solution is heated to 100°, 3 parts of decolourising carbon and 2 parts of sodium hydrosulphite are added. The mixture is filtered through "Hyflo Supercel" and 16 parts of sodium chloride added to the filtrate. The suspension is cooled to 10°, filtered and the residual product washed with 100 parts by volume of 10% sodium chloride solution and dried to give 3.2 parts (34% of the theoretical amount) of the tetrasodium salt of 4,4'-bis-[2''-(4'''-sulphonphenyl)-5''-methyl-v.triazolyl-4'']-stilbene - 2,2'-disulphonic acid as a yellow coloured solid. The product is recrystallized from 10% sodium chloride solution to give a pale yellow coloured solid.

The following Table 1 contains further triazole compounds of Formula I, which are produced according to the preceding examples and are characterized by the symbols Ar, R and Me and by the appearance of the new brightening agents.

TABLE 1

| Example Number | Ar | R | Me | Appearance |
|---|---|---|---|---|
| 8 | 4-(6'-methyl-4'-sulphobenzthiazolyl-2')-phenyl | $CH_3$ | Na | Yellow powder. |
| 9 | Phenyl | $CH_3$ | Na | Pale yellow powder. |
| 10 | 4-ethoxycarbonylphenyl | $CH_3$ | Na | Do. |
| 11 | 4-carboxyphenyl | $CH_3$ | Na | Do. |
| 12 | 4-methoxycarbonylphenyl | $CH_3$ | Na | Yellow powder. |
| 13 | ![structure: phenyl-CH$_2$-O-CO] | $CH_3$ | Na | Do. |
| 14 | 4-methoxyphenyl | $CH_3$ | Na | Do. |
| 15 | 4-(acetylaminosulphonyl)phenyl | $CH_3$ | Na | Pale yellow powder. |
| 16 | 4-(benzoxazolyl-2')phenyl | $CH_3$ | Na | Yellow powder. |
| 17 | 4(-benzimidazolyl-2')phenyl | $CH_3$ | Na | Do. |
| 18 | 5-sulphonaphthyl-2 | $CH_3$ | Na | Pale yellow powder. |
| 19 | 6-sulphonaphthyl-1 | $CH_3$ | Na | Do. |
| 20 | Naphthyl-1 | $CH_3$ | Na | Do. |
| 21 | Naphthyl-2 | $CH_3$ | K | Do. |
| 22 | Diphenylyl-4 | $CH_3$ | Na | Do. |

EXAMPLE 23

10 parts of the hydrazone prepared from p-cyanophenylhydrazine hydrochloride and 4,4' - bis - (1'' - isonitroso-2''-oxophenyl-1'')-stilbene-2,2'-disulphonic acid are added to 77 parts by volume of pyridine and the mixture warmed to 100°. A solution of 13 parts of hydrated cupric sulphate in 20 parts of water is added at 100° during 15 minutes. The solution is heated for 2½ hours at 100° and the pyridine then removed by distillation. As the pyridine is distilled out of the reaction mixture it is continually replaced by the addition of an equal volume of water. At the completion of distillation 23.5 parts of 35.5% hydrochloric acid are added and the reaction mixture cooled to 20°. The mixture is filtered and washed with 200 parts of water and dried to give 9.4 parts of sodium 4,4'-bis-[2''-(4'' - cyanophenyl) - 3'' - oxid - 5''-methyl-v.triazolyl-4''] - stilbene - 2,2' - disulphonate as an orange brown coloured solid.

The N-oxide (9.4 parts) is added to 42 parts of water, 20 parts of acetic acid, 14 parts of 2-ethoxyethanol and 4.7 parts of 35.5% hydrochloric acid. After the addition of 3 parts of zinc dust the mixture is refluxed for 18 hours, then cooled to 10°, filtered and the yellow coloured solid washed with 100 parts of water. The yellow coloured solid is added to 100 parts of water and 23 parts of 4 N sodium hydroxide added. The mixture is stirred for 30 minutes at 20°, then filtered and the residue is dried to give 6.5 parts (68% of the theoretical amount) of sodium 4,4'-bis-[2''-(4'''-cyanophenyl)-5'' - methyl - v.triazolyl- 4'''़]-stilbene-2,2'-disulphonate as a yellow coloured solid. The product is recrystallized from 50% aqueous dimethylformamide solution to give a bright yellow coloured powder. The following Table 2 contains further triazole compounds of the formula

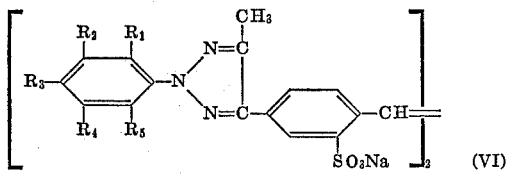

which are produced according to the Examples 1 to 7 and 23 to give pale yellow powders and are characterized by the Symbols $R_1$ to $R_5$.

In the Table 2 all compounds and in Table 1 most compounds are represented as the sodium salts. For the production of the lithium, potassium or ammonium salts, the procedure described in the examples can be followed but the sodium compounds are replaced by the corresponding lithium, potassium or ammonium compounds.

Another method consists in treating the sodium salts in aqueous medium at temperatures of from 20° to 100°, preferably from 50° to 100°, with strong mineral acids such as hydrochloric or sulphuric acid, until the pH value has fallen under 3, filtering the precipitated free sulphonic acids, washing them with acidified water, then introducing

TABLE 2

| Example number | $R_1$ | $R_2$ | $R_3$ | $R_4$ | $R_5$ |
|---|---|---|---|---|---|
| 24 | H | —$SO_3Na$ | H | H | H |
| 25 | $CH_3$— | H | H | H | H |
| 26 | H | Cl | H | H | H |
| 27 | $CH_3$— | H | $CH_3$— | H | H |
| 28 | H | H | F | H | H |
| 29 | Cl | H | H | $SO_3Na$ | H |
| 30 | H | H | $C_2H_5$—O— | H | H |
| 31 | H | H | $nC_4H_9$—O— | H | H |
| 32 | H | H | —$SO_2$—$NH_2$ | H | H |
| 33 | H | —$SO_2$—$NH_2$ | H | H | H |
| 34 | $CH_3O$— | H | H | H | H |
| 35 | $CH_3$— | H | H | $CH_3$— | H |
| 36 | —COOH | H | H | H | H |
| 37 | H | H | —COO—$C_4H_9n$ | H | H |
| 38 | H | H | —CO—NH—$CH_3$ | H | H |
| 39 | H | H | —CO—N($CH_3$)$_2$ | H | H |
| 40 | H | H | —CO—NH—$C_2H_5$ | H | H |
| 41 | H | H | —CO—NH—$C_4H_9n$ | H | H |
| 42 | $CH_3O$— | H | H | $CH_3$— | H |
| 43 | $CH_3$— | H | —$SO_3Na$ | H | H |
| 44 | $CH_3$— | H | —$SO_3Na$ | H | H |
| 45 | H | H | —COO—$C_5H_{11}n$ | H | H |
| 46 | H | —COO—$CH_3$ | H | H | H |
| 47 | H | H | —CO—NH—$C_2H_4$—OH | H | H |
| 48 | H | H | —CO—N($C_2H_4OH$)$_2$ | H | H |
| 49 | H | H | —CO—NH—$CH_2$—CHOH\|$CH_3$ | H | H |
| 50 | H | H | —$SO_2CH_3$ | H | H |
| 51 | H | H | —NH—OC—$CH_3$ | H | H |
| 52 | H | —COOH | H | H | H |
| 53 | H | H | —$SO_2$—NH—$CH_3$ | H | H |
| 54 | H | H | —NH—OC—$C_2H_5$ | H | H |
| 55 | H | H | —NH—OC—O—$C_2H_5$ | H | H |
| 56 | H | H | —NH—OC—O—$CH_3$ | H | H |
| 57 | H | —NH—OC—$CH_3$ | H | H | H |
| 58 | H | H | —n-$C_4H_9$ | H | H |
| 59 | H | H | iso-$C_3H_7$ | H | H |
| 60 | $CH_3O$— | H | H | $CH_3O$— | H |
| 61 | H | H | —$SO_2$—$C_2H_5$ | H | H |
| 62 | H | H | —$SO_2$—N($C_2H_4OH$)$_2$ | H | H |
| 63 | H | —$SO_2$—NH—$CH_3$ | H | H | H |
| 64 | H | H | —$SO_2$—NH—$CH_2$—CHOH\|$CH_3$ | H | H |
| 65 | H | H | —$SO_2$—NH—$C_4H_9n$ | H | H |
| 66 | H | H | —$SO_2$—N($CH_3$)$_2$ | H | H |
| 67 | H | H | —$SO_2$—N($C_2H_5$)$_2$ | H | H |
| 68 | H | H | —$SO_2$—N(—$C_2H_4$—O—$C_2H_4$—) | H | H |
| 69 | H | H | —tert.$C_5H_{11}$ | H | H |
| 70 | H | H | —$SO_2$—N(—($CH_2$)$_5$—) | H | H |
| 71 | H | H | —NH—OC—$C_6H_5$ | H | H |
| 72 | H | H | —NH—OC—$C_6H_4$—Cl | H | H |
| 73 | H | H | —NH—OC—$C_3H_7n$ | H | H |
| 74 | H | H | —$SO_2$—NH—$C_2H_4$—OH | H | H |
| 75 | H | H | —NH—CO—O$C_3H_7n$ | H | H |
| 76 | $CH_3$ | H | H | H | $CH_3$ |
| 77 | $CH_3$ | H | $CH_3$ | H | $CH_3$ |
| 78 | H | H | —$SO_2$—NH—$C_2H_5$ | H | H |
| 79 | H | H | —$SO_2$—N(—($CH_2$)$_4$—) | H | H |
| 80 | H | H | —CO—N($C_2H_5$)$_2$ | H | H | in water, neutralizing with stirring by means of potassium, lithium or ammonium hydroxide, carbonate or bicarbonate, evaporating to dryness or filtering and drying or if possible salting out with a lithium, potassium or ammonium salt, filtering and drying.

In order to produce the amine salts aqueous, aqueous-organic (e.g. aqueous-alcoholic) or organic (e.g. alcoholic) solutions of the low molecular mono-, di- or trialkylamines or mono-, di- or trialkanolamines

[$CH_3-NH_2$ $(CH_3)_2NH$, $(CH_3)_3N$, $C_2H_5-NH_2$, $HO-C_2H_4-NH_2$, $HO-C_3H_6-NH_2$, $(HO-C_2H_4)_2NH$, $(HO-C_2H_4)_3N$, $(HO-C_2H_4)_2-N-CH_3$, $(HO-CH_2)_3\equiv C-NH_2$, etc.] can be used for the neutralization of the free sulphonic acids.

The tetra-alkylammonium hydroxides, e.g. the tetramethylammonium hydroxide, are also employable as neutralizing agents.

The amine salts, especially the alkanolamine salts, are very suitable for the production of liquid preparations.

In order to produce triazole compounds of the Formula I, which are only slightly soluble in water but soluble in organic solvents, i.e. where Me is, e.g., the residue of an amine such as n-octylamine, 2-ethylhexylamine, cyclohexylamine or dicyclohexylamine, the following procedure can be followed:

A water-soluble salt, e.g., the hydrochloride, sulphate or acetate, of the amine is added, preferably in form of an aqueous solution, to the aqueous solution of the sodium salt of the triazole compound of Formula I at temperatures ranging, e.g., from 20° to 100° and the formed precipitate, optionally after cooling to 20° or even to 0–5°, is filtered off, washed with water and dried. The alkaline earth metal salts of the compounds of Formula I which are slightly soluble in water can also be produced by reacting in aqueous medium the sodium salt of the compounds of Formula I with an alkaline earth metal also in form of an aqueous solution.

Application Example A 100 parts of a white nylon 6.66 fabric (Banlon) are entered at 40° into 4000 parts of an aqueous solution containing 3 parts of glacial acetic acid and 0.2 part of the triazole prepared as described in Example 1. The temperature of the bath is raised to 95° during 30 minutes and then held at 90–95° for a further 30 minutes. The fabric is rinsed well in demineralized water and dried at 80°. The treated material is a brilliant white compared with untreated material.

With the triazole compounds prepared in accordance with the Examples 2, 5, 6, 9 and 10, neutral brilliant white brightenings are obtained whereas in the case of the triazole compounds produced according to Examples 4 and 8 the brightenings are somewhat greenish white.

Application Example B 100 parts of a fabric of bleached, mercerised cotton are washed in 5000 parts of an aqueous solution containing 20 parts of a heavy duty detergent based on sodium dodecylbenzenesulphonate and 0.2 part of the triazole prepared as described in Example 1. The cotton piece is entered at 40° and the temperature raised to 95° during 30 minutes. The temperature is maintained at 90–95° for 30 minutes and the fabric rinsed well in demineralized water and then dried at 60°. The treated fabric is a brilliant white compared with untreated cloth.

Brilliant neutral white brightenings are also obtained with the triazole compounds of Examples 2, 5, 6, 9 and 10, 0.1 part of the triazole compounds of Examples 5 and 6 being already sufficient for a good brightening, whereas the triazole compounds of Examples 4 and 8 yield somewhat greenish white brightenings.

Application Example C

A white cotton piece, 120 cm. long and 15 cm. wide is padded with an aqueous solution containing per litre 0.5 gram of sodium carbonate and 1.0 gram of the triazole described in Example 2 and at an expression of 60%. The cotton piece is then dried at 80°; the fabric is considerably brightened by this treatment.

Application Example D 100 parts of a white cotton fabric are treated with a solution containing 0.1 part of a triazole compound described in Example 5 or 6 and 10 parts of hydrated sodium sulphate in 4000 parts of water.

The cotton piece is entered into the solution at 40° and the temperature is raised to 70° over 15 minutes, and maintained at 70° for a further 30 minutes. The fabric is then rinsed well in cold demineralized water and dried at 80°; the cotton fabric is considerably brightened by this treatment.

Application Example E 100 parts of white nylon 66.6 (Banlon) is treated with a solution of 0.2 part of the triazole described in Example 3, 8 parts of sodium chlorite, buffered to pH 3.5 and made up to 4000 parts with water. The buffered system consists of 2.8 parts of sodium perborate, 2.4 parts of sodium nitrate, 2.4 parts of trisodiumpolyphosphate and 0.4 part of a condensation product of di-sec. butylphenol and ethylene oxide, and 50 parts by volume of 10% formic acid. The nylon 6.6 piece is entered into the liquor at 40°. The temperature of the liquor is raised to 90–95° over 30 minutes and maintained at 90–95° for a further 30 minutes. The fabric is then rinsed in cold demineralized water, then in a 0.1% aqueous solution of sodium metabisulphite, and again, thoroughly in cold demineralized water, and finally dried at 80°. The treated nylon 6.6 piece shows a brilliant red-hued brightening compared with the untreated material.

Application Example F 100 parts of bleached wool is treated with a solution of the triazole described in Example 4, 20 parts of a bleaching agent based on sodium hydrosulphite, and 20 parts of 10% aqueous acetic acid, made up to 4000 parts with water. The wool is entered into the liquor at 40° and the temperature of the liquor is raised to 70° over 15 minutes, and kept at 70° for a further 30 minutes. The fabric is then removed from the bath, rinsed thoroughly in demineralized water, and dried at 60°. The treated material shows an appreciable whitening compared with the untreated material.

Formulae of representative brightening agents of the foregoing examples are as follows:

Examples 1 and 3

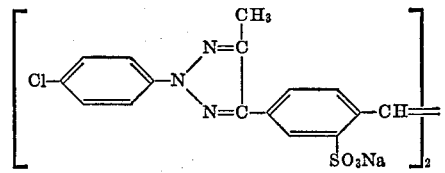

Example 2

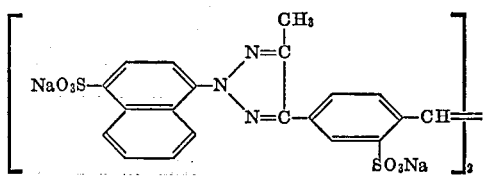

Examples 4 and 23

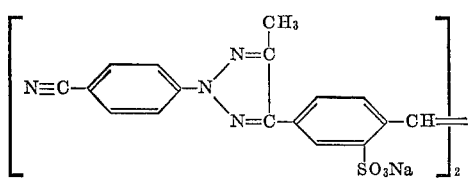

Examples 5 and 6

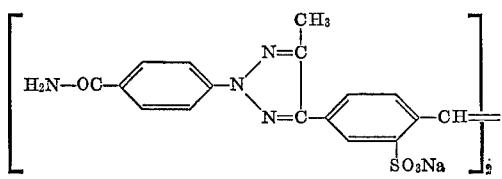

Example 7

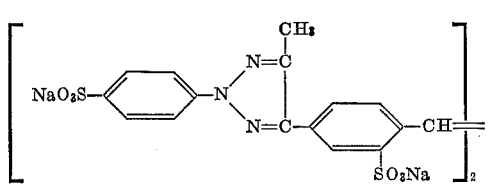

Example 9

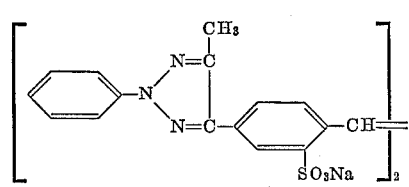

Example 10

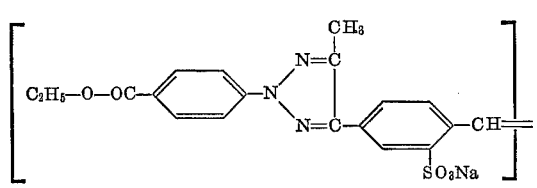

Having thus disclosed the invention what we claim is:

1. A triazole derivative of the formula

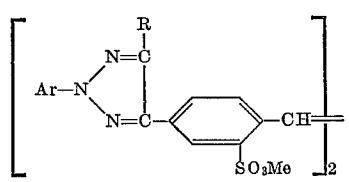

wherein

Ar is substituted or unsubstituted and is phenyl, naphthyl, diphenyl, pyridyl-2, -3, or -4, or benzthiazolyl-2, the substituents being selected from the group consisting of lower alkyl, lower alkoxy, halo, cyano, lower alkylsulphonyl, carboxylic acid, lower carboxylic acid ester, lactone, sulfonic acid, aminosulfonyl, aminosulfonyl substituted by 1 or 2 lower alkyl or hydroxyalkyl groups, morpholinosulfonyl, pyrrolidinosulfonyl, piperidinosulfonyl, hexamethyleneiminosulfonyl, aminocarbonyl, aminocarbonyl substituted by 1 or 2 lower alkyl or hydroxyalkyl groups, substituted or unsubstituted benzoylamino, substituted or unsubstituted phenylsulfonylamino, lower alkylsulfonyl amino, lower alkanoylamino, lower alkoxycarbonylamino, benzoxazolyl, benzthiazolyl, and benzimidazolyl, in which the phenyl ring of any substituted benzoylamino or substituted phenylsulfonylamino is substituted by lower alkyl or halo, R is hydrogen, lower alkyl, or substituted or unsubstituted phenyl wherein the substituents are the same as those for Ar, and Me is a hydrogen, ammonium, or alkali metal ion, an equivalent of an alkaline earth metal or an amine cation derived from an amine of the formula

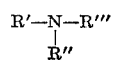

wherein R', R'', and R''' are, independently, hydrogen, alkyl of 1 to 5 carbon atoms, hydroxyalkyl of 1 to 3 carbon atoms, or alkoxyalkyl of 1 to 5 carbon atoms or from amino-tris-hydroxymethylmethane, tetramethylammonium hydroxide or tetraethylammonium hydroxide.

2. A triazole derivative according to claim 1 wherein Me is hydrogen, ammonium, or alkaline metal ion, an equivalent of an alkaline earth metal or an amine cation derived from methylamine, ethylamine, n-propylamine, n-butylamine, n-amylamine, iso-propylamine, iso-butylamine, tert.-butylamine, dimethylamine, trimethylamine, methylethylamine, diethylamine, triethylamine, monoethanolamine, diethanolamine, N-methyldiethanolamine, triethanolamine, isopropanolamine, di-iso-propanolamine, tri-iso-propanolamine, 2 - ethoxyethylamine, 2 - methoxyethylamine, 3 - methoxypropylamine, amino-tris-hydroxymethylmethane, tetramethylammonium hydroxide, or tetraethylammonium hydroxide.

3. A triazole derivative according to claim 1 wherein R is methyl, and
Ar is naphthyl, sulphonaphthyl, diphenyl or substituted or unsubstituted phenyl in which the substituents are chloro, fluoro, alkyl of 1 to 5 carbon atoms, alkoxy of 1 to 4 carbon atoms, cyano, carboxy, sulfo, alkoxycarbonyl, substituted or unsubstituted aminocarbonyl, substituted or unsubstituted aminosulfonyl or lactone.

4. The triazole derivative according to claim 1 of the formula

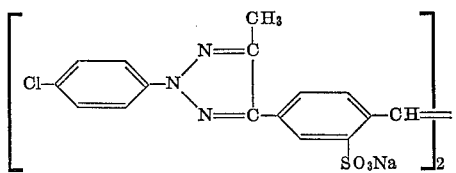

5. The triazole derivative according to claim 1 of the formula

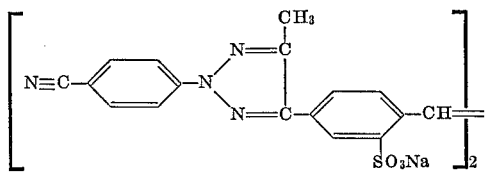

6. The triazole derivative according to claim 1 of the formula

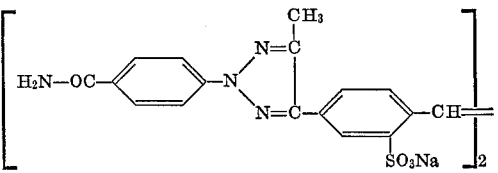

7. The triazole derivative according to claim 1 of the formula
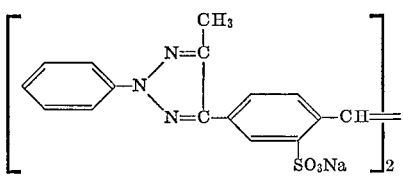
8. The triazole derivative according to claim 1 of the formula
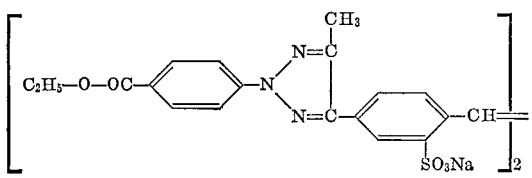
References Cited
UNITED STATES PATENTS
| | | |
|---|---|---|
| 3,453,268 | 7/1969 | Dorlars et al. ____ 260—240 CA |
| 3,459,744 | 8/1969 | Dorlars et al. ____ 260—240 CA |
| 3,485,831 | 12/1969 | Dorlars et al. ____ 260—240 CA |
| 3,579,511 | 5/1971 | Weber et al. ____ 260—240 CA |
JOHN D. RANDOLPH, Primary Examiner
U.S. Cl. X.R.
117—33.5 T; 252—301.2 W, 543; 260—239 B, 247.5 R, 304, 307 D, 309.2, 326.85, 346.2 R, 465 E, 471 R, 556 AR, 558 H, 569